(12) United States Patent
Gan et al.

(10) Patent No.: US 11,556,385 B2
(45) Date of Patent: Jan. 17, 2023

(54) COGNITIVE PROCESSING RESOURCE ALLOCATION

(71) Applicant: Kyndryl, Inc., New York, NY (US)

(72) Inventors: Seng Chai Gan, Ashburn, VA (US); Shikhar Kwatra, Durham, NC (US); Indervir Singh Banipal, Austin, TX (US); Abhishek Malvankar, White Plains, NY (US)

(73) Assignee: Kyndryl, Inc., New York, NY (US)

( * ) Notice: Subject to any disclaimer, the term of this patent is extended or adjusted under 35 U.S.C. 154(b) by 379 days.

(21) Appl. No.: 16/874,954

(22) Filed: May 15, 2020

(65) Prior Publication Data

US 2021/0357259 A1    Nov. 18, 2021

(51) Int. Cl.
*G06F 9/50* (2006.01)
*G06N 20/00* (2019.01)
*G06F 9/445* (2018.01)

(52) U.S. Cl.
CPC .......... *G06F 9/5011* (2013.01); *G06F 9/4451* (2013.01); *G06N 20/00* (2019.01)

(58) Field of Classification Search
CPC .... G06F 9/4451; G06F 9/5094; G06F 9/5011; G06N 3/006; G06N 20/00
USPC ........................................................ 718/104
See application file for complete search history.

(56) References Cited

U.S. PATENT DOCUMENTS

| | | | |
|---|---|---|---|
| 5,799,067 A | 8/1998 | Kikinis et al. | |
| 5,799,068 A | 8/1998 | Kikinis et al. | |
| 6,807,614 B2 | 10/2004 | Chung | |
| 7,546,438 B2 | 6/2009 | Chung | |
| 2016/0266936 A1* | 9/2016 | Bryant | G06F 9/5055 |
| 2017/0003861 A1 | 1/2017 | Kim et al. | |
| 2017/0372153 A1 | 12/2017 | Justice et al. | |
| 2019/0294517 A1 | 9/2019 | Cazarez Aguilar et al. | |

OTHER PUBLICATIONS

Mell et al., "The NIST Definition of Cloud Computing", Recommendations of the National Institute of Standards and Technology, NIST Special Publication 800-145, Sep. 2011, 7 pages.
IBM, "IBM Cloud Pak for Data", Overview, printed Mar. 9, 2020, 10 pages, https://www.ibm.com/products/cloud-pak-for-data.
IBM, "Installing Watson Assistant", Cloud Pak for Data Product, printed Mar. 9, 2020, 21 pages.
IBM, "Installing Watson Assistant Discovery Extension" IBM Cloud Docs, Watson Assistant Discovery Extension for IBM Cloud Private, Last Updated: Feb. 21, 2019, 11 pages.

(Continued)

*Primary Examiner* — John Q Chavis
(74) *Attorney, Agent, or Firm* — John Kennel, Esq.; Kevin P. Radigan, Esq.; Heslin Rothenberg Farley & Mesiti P.C.

(57) ABSTRACT

A processor may run a background process to identify a first task being initiated by a first user on a device, where the first task is associated with a first application. The processor may identify the first user of the device. The processor may analyze one or more interactions of the first user associated with the first application on the device. The processor may allocate, based at least in part on identification of the first user, identification of the first task, or analysis of the one or more interactions of the first user, computing resources to one or more hardware components on the device.

18 Claims, 6 Drawing Sheets

(56) References Cited

OTHER PUBLICATIONS

Author Unknown, "Proactive resource allocation based on the usage pattern (compliance factor)", An IP.com Prior Art Database Technical Disclosure, IP.com No. IPCOM000062148D, IP.com Electronic Publication Date: Feb. 17, 2005, 4 pages.

McKinsey Global Institute, "The Age of Analytics: Competing in a Data-Driven World", Dec. 2016, 136 pages.

Open Data Hub, "A Data & AI Platform for the Hybrid Cloud", printed Mar. 9, 2020, 3 pages, https://opendatahub.io/.

Open Shift, "Interactive Learning Portal", Red Hat, printed Mar. 9, 2020, 3 pages, https://learn.openshift.com/ai-machine-learning.

OperatorHub.io, "Welcome to OperatorHub.io", The Registry for Kubernetes Operators, printed Mar. 9, 2020, 3 pages, https://operatorhub.io/?keyword=open+.

Wikipedia, "Strassen algorithm", page last printed Mar. 6, 2020, 5 pages, https://en.wikipedia.org/wiki/Strassen_algorithm.

\* cited by examiner

COGNITIVE PROCESSING RESOURCE ALLOCATION

BACKGROUND

The present disclosure relates generally to the field of cognitive computing, and more specifically to cognitive allocation of computing resources of hardware components.

Computer systems are often used by multiple users, or in various ways by a single user. The activities performed by each user, or the activities themselves, may differ significantly, for instance, regarding which hardware components or computing resources are being used more when a specific user is using the computer system.

SUMMARY

Embodiments of the present disclosure include a method, computer program product, and system for allocating computing resources. A processor may run a background process to identify a first task being initiated by a first user on a device, where the first task is associated with a first application. The processor may identify the first user of the device. The processor may analyze one or more interactions of the first user associated with the first application on the device. The processor may allocate, based at least in part on identification of the first user, identification of the first task, or analysis of the one or more interactions of the first user, computing resources to one or more hardware components on the device.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
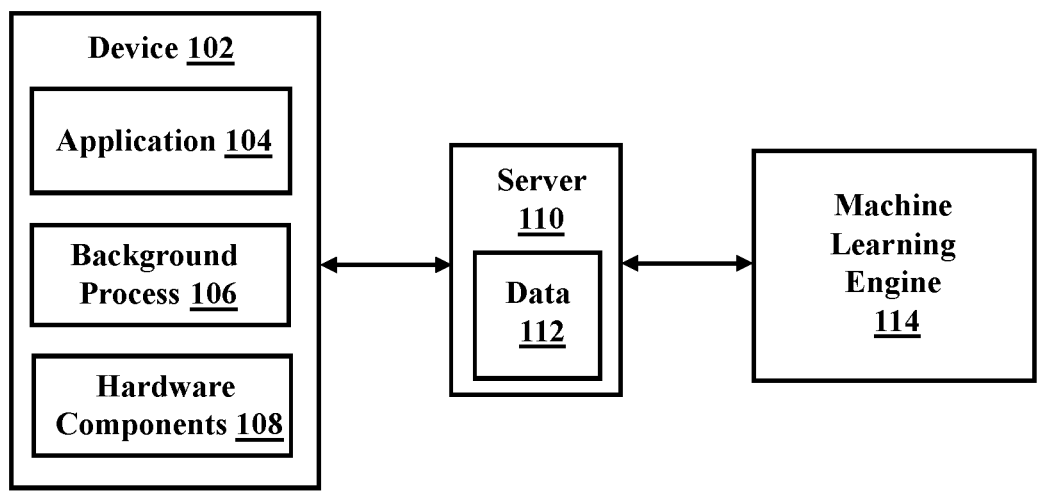
FIG. 1 is a block diagram of an exemplary system for allocating computing resources, in accordance with aspects of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of cognitive computing, and more specifically to cognitive allocation of computing resources of hardware components. While the present disclosure is not necessarily limited to such applications, various aspects of the disclosure may be appreciated through a discussion of various examples using this context.

In some embodiments, a processor running (e.g., utilizing, implementing, etc.) a background process, may identify a first task being initiated by a first user on a device. In some embodiments, the first task may be associated with a first application. In some embodiments, the processor may identify the first user of the device. In some embodiments, one or more interactions of the first user associated with the first task of the device may be analyzed. In some embodiments, computing resources may be allocated to one or more hardware components on the device. In some embodiments, the computing resources may be allocated based at least in part on identification of the first user, identification of the first task, or analysis of the one or more interaction of the first user associated with the first task.

For example, a user may login to an operating system and start a gaming application on a computer. A processor may run a background process to detect a first task associated with the gaming application which is initiated by the user. The first task may be, for example, opening the gaming application. In some embodiments, the processor may also use the background process to identify the first user of the device, for example, based on a username or other identifying information used to login to the operating system.

In some embodiments, the processor may further use the background process to analyze interactions of the user associated with the first application on the computer. Furthering the example above, the processor may analyze how the user is playing the gaming application (e.g., identifying keystrokes, identifying the frequency of specific keystrokes, identifying which computing resources [e.g., processors, memory, disk, network and video cards, SCSI controller, mouse and keyboard] are being utilized, etc.). In some embodiments, the processor may allocate computing resources to hardware components on the device by, for example, after loading the gaming application, lessening the use of central processing units ("CPUs") on the computer in order to increase the use graphics processing units ("GPUs") on a display (e.g., hardware component) of the computer.

In some embodiments, the allocation of computing resources to hardware components may be based on the identification of the first task. In some embodiments, the first task may be any task run on a computing device and associated with an application (e.g., initiations of a gaming application, initiation of a word processing application, initiation of an application conducting deep learning computations, etc.). In some embodiments, the allocation of computing resources may be based on the identification of the first user.

For example, the processor may be able to associate computing resource requirements with a particular user based on historical information about user activities which can be used to determine usage patterns, e.g., historical information associated with a particular user may indicate that the particular user uses word processing applications before five pm and video streaming applications after five pm. Based on the historical information associated with the user, the background process may allot, for example, more CPU resources before five pm and more GPU resources after five pm. As another example, the identity of the user may be associated with particular applications and application usage because of a dedicated user login to the operating system corresponding to the use of specific applications.

Computing resources may be allocated to one or more hardware components based at least in part on identification of the first user, identification of the first task, or the analysis of the one or more interaction of the first user associated with the first application, and/or any combination of these factors. For example, computing resources may be allocated after identification of a particular user and identification that the user is initiating a particular application, e.g., user A may use an internet browser application for watching video files, whereas user B may use an internet browser application for sending email. Based on the identification of the users, user A or user B, and the identification of the first task, initiation of an internet browser application, different computing resources may be allocated to one or more hardware components.

In some embodiments, the background process may be any process that does not need to be directly controlled by a user and can perform the steps, methods, or operations described herein. The background process may be a daemon and may, for example, perform predefined tasks at scheduled times and/or run continuously for periods of times. The background process may use tools like top (on Linux systems), vmstat, and/or system management interface by NVIDIA (NVIDIA-smi) to gather data on user activity, and the background process may store this data, with user consent, on a remote server.

In some embodiments, computing resources may be allocated to hardware components once a recommendation of the allocation is provided to a user and the user accepts the recommendation. In other embodiments, computing resources may be allocated to hardware components automatically without user input.

In some embodiments, identifying the first user may involve selecting a default profile associated with the first user. In some embodiments, the default profile may be based on data received from a user identity program. For example, the identity program may be a repository of default profile information. When the background process identifies that a task is being initiated by a user who has not been identified, a default profile may be selected from the repository to identify the user. The default profile may be associated with the task initiated (for example, if the user is signing into a tax program, the default profile may have additional encryption than a profile for accessing online news), or the default profile may have no relationship with the task being initiated by the user.

In some embodiments, the background process may identify the user by gathering data from the device and using the gathered data to classify an identity of the user. In some embodiments, the gathered data may be associated with a time of use of the device. For example, data may be gathered indicating that a particular device is used for word processing purposes when used before five pm and for gaming purposes when used after eight pm. The processor may classify an identity of a first user using the computer before five pm for whom more CPU resources may be needed, for example, and may classify an identity of a second user using the computer after eight pm for whom, for example, more GPU resources may be needed.

In some embodiments, the gathered data may be associated with use of a password or other credentials associated with a user. For example, data associated with a password or other credentials associated with a user, e.g., when the user accesses an application (for example, logs into a bank account, library account, or newspaper account on the internet, or uses specific credential to access an email application, a video communication application, or video game application on a computer) may be used to classify an identity of the user. Some users (for example, those accessing the bank account, library account, or newspaper account on the internet) may be classified with a first identity for which more CPU resources may be allocated. Other users (for example, those accessing a video communication application or video game application) may be classified with a second identity for which more GPU resources may be allocated.

In some embodiments, the gathered data may be associated with the application used on the device. For example, a first identity may be classified based on gathered data indicating that an application performing deep learning computations, for which more GPU computing resources may be allocated, is being used. A second identity may be classified based on gathered data indicating that a second application, for which more CPU resources may be allocated, is being used.

In some embodiments, the gathered data may be associated with the identity of previous users. In some embodiments, a first user may be identified by classifying the identity of the first user based on the identity of previous users. For example, if a previous user of a computer utilized the computer for performing deep learning computations, the identity of a subsequent user of the computer may be classified as similar to the previous user, and a similar allocation of computing resources may be selected for this user.

In some embodiments, the gathered data may be associated with events calendared into a device calendar. For example, if a calendar associated with the computer includes an entry specifying that the computer will be used for certain purposes at a certain time, the identity of a first user may be classified as belonging to a certain type based on the calendared purpose of computer use. That is, data gathered about a calendared event (for example, a video meeting or a time to play a multiplayer game) may be used to classify a user as belonging to a specific category of users (for example, gaming users or video application users) which may require a particular allocation of computing resources.

In some embodiments, an identity may be classified based on data gathered indicating how an application is utilized. For example, a first identity may be classified based on gathering data indicating that a particular gaming application is requiring low processing power where low processing powering is identified by, for example, analyzing use of computer resources. The first identity may be associated with allocation of less CPU computing resources. A second identity may be classified based on gathered data indicating that the same gaming application is requiring high processing power, where high processing power is identified by, for example, analyzing use of computer processor resources.

In some embodiments, the computing resources may be allocated to one or more hardware components including a central processing unit ("CPU"), a graphics processing unit ("GPU"), or a tensor processing unit ("TPU"). In some embodiments, the hardware components to which computing resources are allocated may include a CPU as well as a GPU and/or a TPU.

In some embodiments, allocation of computing resources to hardware components may involve switching between two or more resource allocation modes. In some embodiments, switching may be performed based on the one or more interactions of the first user with the device or with one or more applications on the device, where the one or more interactions of the first user exceeds a threshold.

For example, a first resource allocation mode may involve allocation of computing resources to two of four CPUs and one of four GPUs. A second resource allocation mode may involve allocation of computing resources to one of four CPUs and two of four GPUs. In some embodiments, the device may switch between the first and second resource allocation modes based on the interaction of a user with the device or with applications on the device. For example, a user may use a web browser application initially to browse a news website and later use the web browser application to watch a movie using a video streaming service. Based on the user's changed use of the application, the device may switch from the first resource allocation mode to the second resource allocation mode.

In some embodiments, the modes may be switched when a quality of the interactions of the user on an application exceeds a threshold, which may indicate that the user has changed how she uses the web application. In some embodiments, the modes may be switched when the number of interactions of the user changes. For example, data may be gathered about the number of keystrokes or frequency of keystrokes. When the number or frequency of keystrokes exceeds a threshold, processing resources may be adjusted by switching to a new mode to account for new conditions, such as, for example, the use of additional Bluetooth resources for a wireless keyboard.

In some embodiments, a background process may identify a second task being initiated by a second user on a device. In some embodiments, the processor may be associated with a second application. In some embodiments, the background process may identify the second user of the device. In some embodiments, one or more interactions of the second user associated with the second task of the device may be analyzed. In some embodiments, one or more computing resources may be allocated to hardware components on the device. In some embodiments, the computing resources may be allocated based at least in part on identification of the second user, identification of the second task, or analysis of the one or more interaction of the second user associated with the second task.

For example, a first user may login to an operating system and start a web browsing application on a computer. A processor may use a background process to detect a first task, associated with the web browsing application. The processor may also analyze one or more interactions of the first user and determine that the first user is using the web browsing application to read the news. Based at least in part on the identification of the first user, the first user's initiation of the web browsing application, and the first user's use of the web browsing application to read the newspaper, the processor may allocate the use of two of four available CPUs. In response to a second user logging into the operating system and starting the web browsing application, the processor may analyze one or more interactions of the second user and determine that the second user is using the web browsing application to play an online game. Based at least in part on the identification of the second user, the second user's initiation of the web browsing application, and the second user's use of the web browsing application to play an online game, the processor may allocate the use of two of the four available CPUs and one of four available GPUs. It should be noted that the second application can be the same as the first application, or it may be different.

In some embodiments, allocating computing resources may involve using a machine learning model (e.g., deep learning computations, etc.). For example, a trained machine learning engine may receive information or data regarding the identity of a first task being initiated by a first user on a device, information or data regarding the identity of the first user of the device, and/or information or data analyzing one or more interactions of the first user associated with the first task or first application on the device. The trained machine learning engine may then output an allocation of computing resources to hardware components.

As another example, the machine learning model may be used to identity the first task initiated by a first user (e.g., initiation of a gaming application), identify the first user of the device (e.g., a user whose historical usage data indicates that the user utilizes gaming applications), or analyze one or more interactions of a user associated with the first task or first application (e.g., to classify that a user utilizes a web browsing application to play video games, rather than read the news).

In some embodiments, the machine learning model be a reinforcement learning model or a machine learning engine may utilize a reinforcement learning model to allocate one or more computing resources to hardware components. In some embodiments, the reinforcement learning model may be used to determine the computing resources required by the device and to switch the allocation of computing resource to hardware resources based on the estimated needs of the user.

In some embodiments, computing resource allocation may occur based on task and user profile classifications. For example, the reinforcement learning model may model a state as it records the user logging into a computing device with a given environment. As a further example, the reinforcement learning model may model an environment as the environment where the current configuration is being monitored.

In some embodiments, the agent for the reinforcement learning model may be the software agent running on the system to monitor actions. As an example, a reward for the reinforcement learning model may be a function which is variably modified based on the task executed. If based on a given state, agent, and environment, the system is able to compute the output of a given task (e.g., intensive learning algorithm), the reward function may be incremented by +x, which may be configured by the user. In some embodiments, if, based on the state, agent, and environment, Time_compute is greater than Expected_time compared to other configurations, the reward function may be decremented. It is noted that current state and environment configuration parameters may be recorded, and a new state may be adopted to recompute the reward. In some embodiments, user history (e.g., including tasks, configuration switching, params configuration, etc.) may be used to modify an agent's action and dynamically switch to different processor states to maximize the reward function.

In some embodiments, the machine learning model, as associated with the first user, may be continuously refined based on the analysis of the one or more interactions of the first user. For example, a first user may use a computing device for one purpose initially, and by continuously refining the machine learning model associated with the first user, the machine learning model may adjust with the changes in the first user's usage of the computing device for other purposes.

For example, if the first user initially uses a computer system primarily to run mathematic computations, but later uses the computer system primarily to read articles, the continuous refinement of the machine learning model may result in a different allocation of computing resources when the first user uses the computer system.

In some embodiments, the machine learning model may utilize user feedback regarding allocation of the computing resources. For example, in response to changes in the allocation of computing resources, a user may be prompted through a user interface to provide feedback regarding aspects of the performance of the computing device. For example, the user may be prompted to provide feedback about the computer's performance or power usage. Based on the feedback from the user, the model may be trained to use more or less CPUs, GPUs, or TPUs under various circumstances.

Referring now to FIG. 1, illustrated is a block diagram of a system 100 for allocating computing resources. In some embodiments, the system 100 includes a device 102, a server 110, and a machine learning engine 114. In some embodiments, an application 104 and a background process 106 (e.g., software, daemon, etc.) run on the device 102. In some embodiments, the device 102 includes hardware components 108 (e.g., CPU, GPU, TPU, etc.).

In some embodiments, information and data 112 is gathered regarding: the identity of a first user of the device 102, a first task associated with the application 104, and/or one or more interactions of the first user associated with the application 104, and the data 112 is sent to the server 110. In some embodiments, a machine learning engine 114 (e.g., in communication with the server 110, on the cloud, etc.) receives the data 112 and determines an allocation of computing resources for the device 102.

In some embodiments, the allocation of computing resources to one or more hardware components 108 (which may include one or more CPUs, GPUs, and TPUs) of the device 102 is made based on data 112 gathered using the background process 106 and based at least in part on the identification of the first user, identification of the first task, or analysis of one or more interactions of the first user with the application 104. In some embodiments, the device 102 and may be any device that contains a processor configured to perform one or more of the functions or operations described in this disclosure. The machine learning engine 114 optimizes resource allocation for the device 102 and may also rely on user feedback regarding the allocation of computing resources.

Figure 2A:
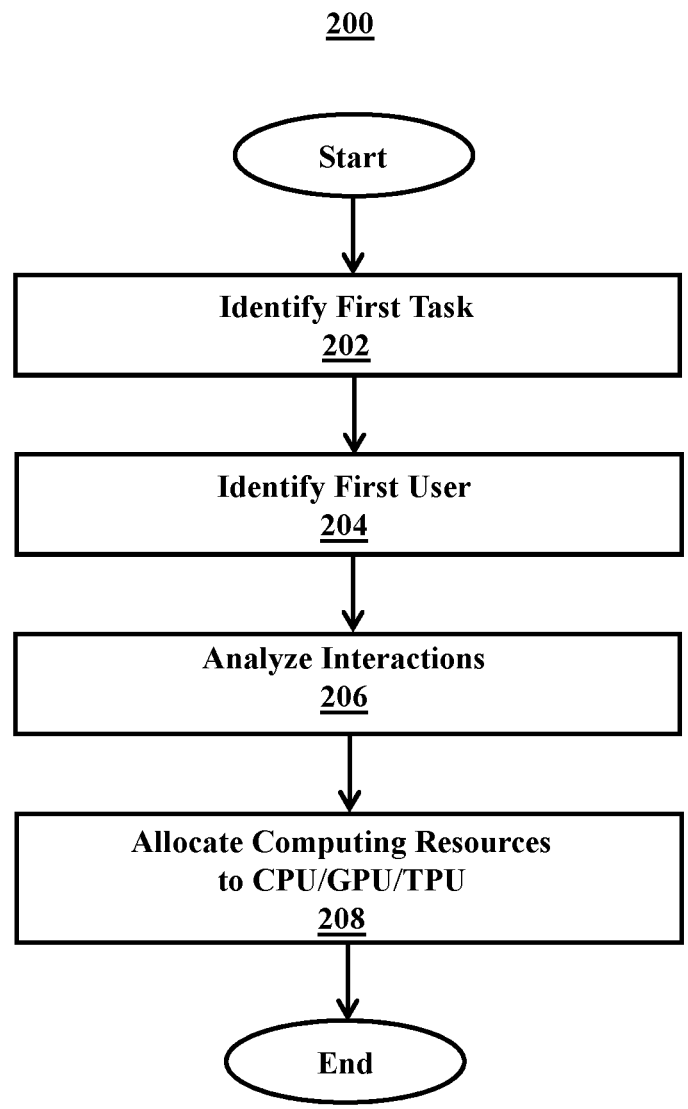
FIG. 2A is a flowchart of an exemplary method for allocating computing resources, in accordance with aspects of the present disclosure.

Referring now to FIG. 2A, illustrated is a flowchart of an exemplary method 200 for allocating computing resources, in accordance with embodiments of the present disclosure. In some embodiments, a processor may perform the operations of the method 200. In some embodiments, the method 200 begins at operation 202. At operation 202, a first task being initiated by a first user on a device is identified using a processor running a background process. The first task is associated with a first application. In some embodiments, the method 200 proceeds to operation 204, the first user of the device is identified using the background process. In some embodiments, the method 200 proceeds to operation 206 where the processor analyzes one or more interactions of the first user associated with the first application on the device. In some embodiments, the method 200 proceeds to operation 208 where the processor allocates computing resources to one or more hardware components on the device. In some embodiments, the hardware components are a CPU, GPU, or TPU. In some embodiments, after operation 208, the method 200 may end.

Figure 2B:
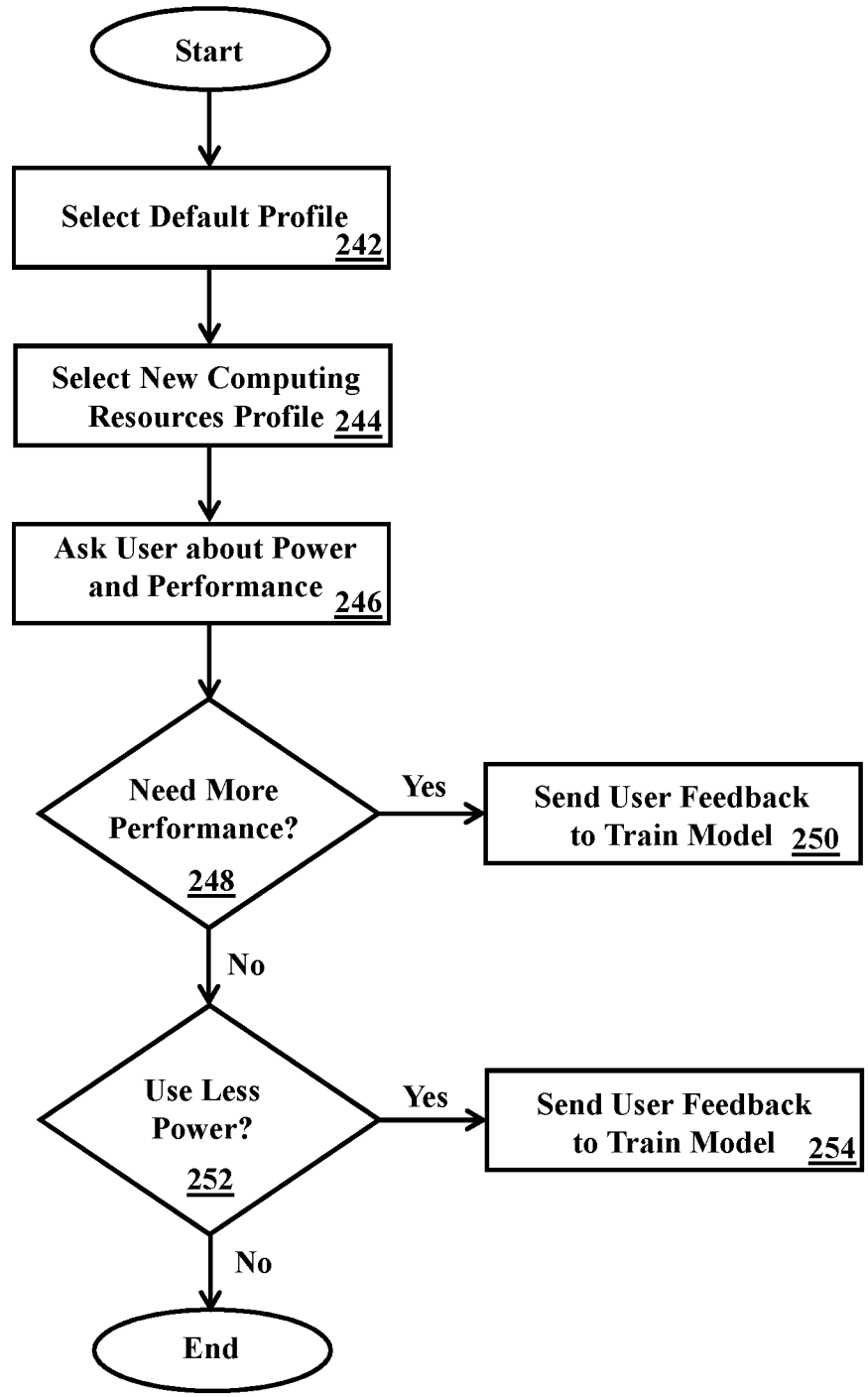
FIG. 2B is a flowchart of an exemplary method for allocating computing resources, in accordance with aspects of the present disclosure.

Referring now to FIG. 2B, illustrated is a flowchart of an exemplary method 240 for allocating computing resources, in accordance with embodiments of the present disclosure. In some embodiments, the method 240 may be an extension of the method 300 or the method 240 may be a variation of the method 200. In some embodiments, the method 240 begins at operation 242. At operation 242, a user logs into a device, and a default processor profile is selected for the user. In some embodiments, the method 240 proceeds to operation 244, where the processor selects a new computing resource profile for the user in response to the user initiating a task. In some embodiments, the computing resource profile for the user includes the selection of hardware resources (e.g., CPU, TPU, GPU, etc.) for the device. In some embodiments, the method 240 proceeds to operation 246. At operation 246, the user is prompted to provide feedback about the power and performance of the device, for example, after the task is completed. In some embodiments, the method 240 proceeds to decision block 248. At decision block 248, the user provides feedback regarding whether more performance was needed during the time that the computing resource profile was in use. In some embodiments, if the user provides feedback that more performance was needed, the method 240 proceeds to operation 250. At operation 250, the user feedback is sent to train a machine learning model to use more hardware components (e.g., CPU/GPU/TPU, etc.). In some embodiments, if the user provides feedback that more performance was not needed, the method 240 proceeds to decision block 252. At decision block 252, the user provides feedback regarding whether less power usage was needed during the time that the computing resource profile was in use. In some embodiments, if the user provides feedback that less power usage was needed, the method 240 proceeds to operation 254. At operation 254, the user feedback is sent to train a machine learning model to use less hardware components (e.g., CPU/GPU/TPU, etc.) in future computing resource profiles. In some embodiments, the method 240 may end after user feedback is sent to train the model at operations 250 or 254 or after no feedback is sent after decision blocks 248 and 252.

As discussed in more detail herein, it is contemplated that some or all of the operations of the methods 200 and 240 may be performed in alternative orders or may not be performed at all; furthermore, multiple operations may occur at the same time or as an internal part of a larger process.

Additionally, the present technology may be implemented within or as part of a cloud computing environment. It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
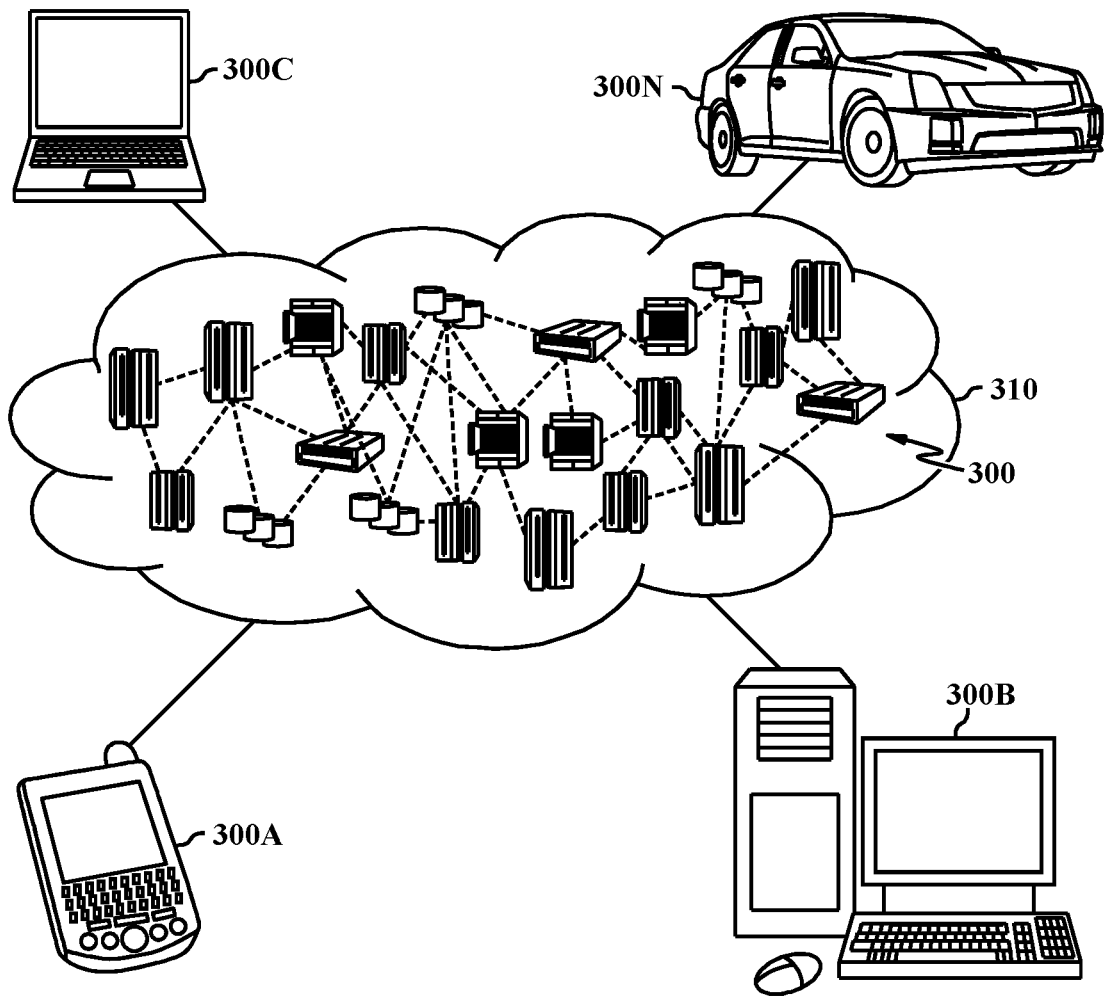
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
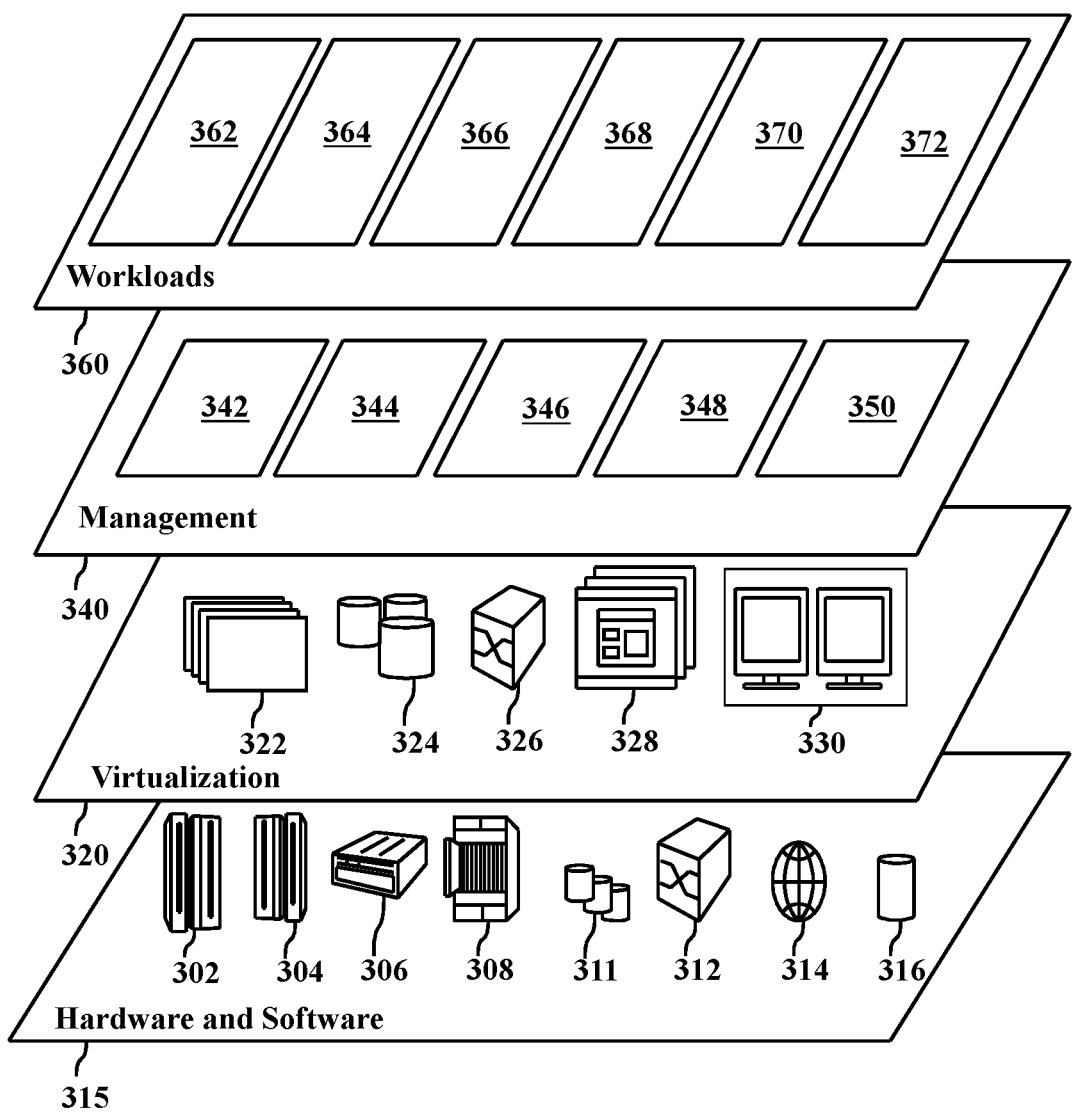
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and cognitive computing resource allocating 372.

Figure 4:
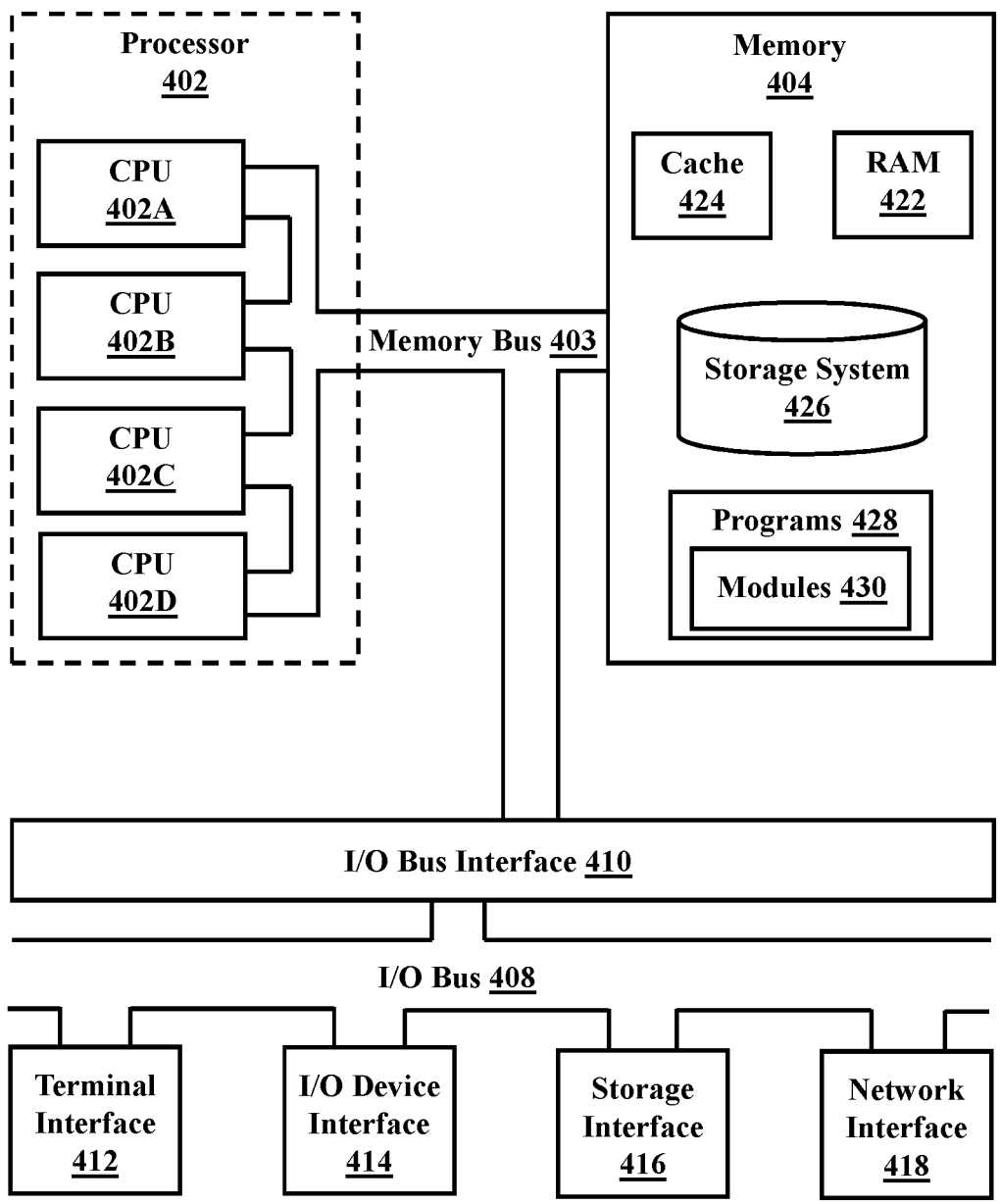
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method for allocating computing resources, the method comprising:
   ascertaining identification of a first task being initiated by a first user on a device, wherein the first task is associated with a first application;
   obtaining an identification of the first user of the device;
   analyzing one or more interactions of the first user associated with the first application on the device; and
   allocating to the first application, based at least in part on one or more of identification of the first user, identification of the first task, and analysis of the one or more interactions of the first user, computing resources to multiple hardware components on the device, the allocating including:
      switching between two or more resource allocation modes, the switching being based on the interactions of the first user exceeding a threshold, and the two or more resource allocation modes comprising different resource allocation modes of the device with different specified resource allocations of one hardware component and another hardware component of the multiple hardware components.

2. The method of claim 1, wherein identifying the first user comprises:
   gathering data, using the background process, from the device, wherein the gathered data is associated with a time of use of the device, use of a password or other credentials associated with the first user, the application used on the device, how the application is being utilized, the identity of previous users, or events calendared into a device calendar; and
   classifying an identity of the first user.

3. The method of claim 1, wherein identifying the first user comprises:
   selecting a default profile associated with the first user, wherein the default profile is based on data received from a user identity program.

4. The method of claim 1, wherein the one hardware component comprises a CPU and the other hardware component comprises at least one of a GPU and TPU.

5. The method of claim 1, wherein allocating the computing resources comprises:
   using a machine learning model to allocate the computing resources.

6. The method of claim 5, wherein allocating the computing resources comprises:
   continuously refining the machine learning model as associated with the first user based on the analysis of the one or more interactions of the first user.

7. The method of claim 5, wherein the machine learning model utilizes user feedback regarding allocation of the computing resources.

8. The method of claim 1, further comprising:
   identifying, using the background process, a second user of the device;
   identifying, using the background process, a second task being initiated by the second user on the device, wherein the second task is associated with a second application;
   analyzing one or more interactions of the second user associated with the second application on the device; and
   allocating to the second application, based at least in part on one or more of identification of the second user, identification of the second task, and analysis of the one or more interactions of the second user, computing resources to multiple hardware components on the device.

9. A system comprising:
   a memory; and
   a processor in communication with the memory, the processor being configured to perform operations comprising:
      ascertaining identification of a first task being initiated by a first user on a device, wherein the first task is associated with a first application;
      obtaining an identification of the first user of the device;
      analyzing one or more interactions of the first user associated with the first application on the device; and
      allocating to the first application, based at least in part on one or more of identification of the first user, identification of the first task, and analysis of the one or more interactions of the first user, computing resources to multiple hardware components on the device, the allocating including:
         switching between two or more resource allocation modes, the switching being based on the interactions of the first user exceeding a threshold, and the two or more resource allocation modes comprising different resource allocation modes of the device with different specified resource allocations of one hardware component and another hardware component of the multiple hardware components.

10. The system of claim 9, wherein identifying the first user comprises:
    gathering data, using the background process, from the device, wherein the gathered data is associated with a time of use of the device, use of a password or other credentials associated with the first user, the application used on the device, how the application is being utilized, the identity of previous users, or events calendared into a device calendar; and
    classifying an identity of the first user.

11. The system of claim 9, wherein identifying the first user comprises:
    selecting a default profile associated with the first user, wherein the default profile is based on data received from a user identity program.

12. The system of claim 9, wherein the one hardware component comprises a CPU and the other hardware component comprises a GPU and TPU.

13. The system of claim 9, wherein allocating the computing resources comprises:
    continuously refining a machine learning model as associated with the first user based on the analysis of the one or more interactions of the first user.

14. A computer program product comprising a computer readable storage medium having program instructions embodied therewith, the program instructions executable by a processor to cause the processor to perform operations, the operations comprising:
    ascertaining identification of a first task being initiated by a first user on a device, wherein the first task is associated with a first application;
    obtaining an identification of the first user of the device;
    analyzing one or more interactions of the first user associated with the first application on the device; and
    allocating to the first application, based at least in part on one or more of identification of the first user, identification of the first task, and analysis of the one or more interactions of the first user, computing resources to multiple hardware components on the device, the allocating including:

switching between two or more resource allocation modes, the switching being based on the interactions of the first user exceeding a threshold, and the two or more resource allocation modes comprising different resource allocation modes of the device with different specified resource allocations of one hardware component and another hardware component of the multiple hardware components.

15. The computer program product of claim 14, wherein identifying the first user comprises:

selecting a default profile associated with the first user, wherein the default profile is based on data received from a user identity program.

16. The computer program product of claim 14, wherein identifying the first user comprises:

gathering data, using the background process, from the device, wherein the gathered data is associated with a time of use of the device, use of a password or other credentials associated with the first user, the application used on the device, how the application is being utilized, the identity of previous users, or events calendared into a device calendar; and classifying an identity of the first user.

17. The computer program product of claim 14, wherein the one hardware component comprises a CPU and the other hardware component comprises a GPU and TPU.

18. The computer program product of claim 14, wherein allocating the computing resources comprises:

utilizing a machine learning model utilizing user feedback regarding allocation of the computing resources.

* * * * *